May 26, 1964  J. RUDELICK  3,134,403
ROTATABLE SPINDLE PILOT VALVE
Filed April 2, 1962  5 Sheets-Sheet 1
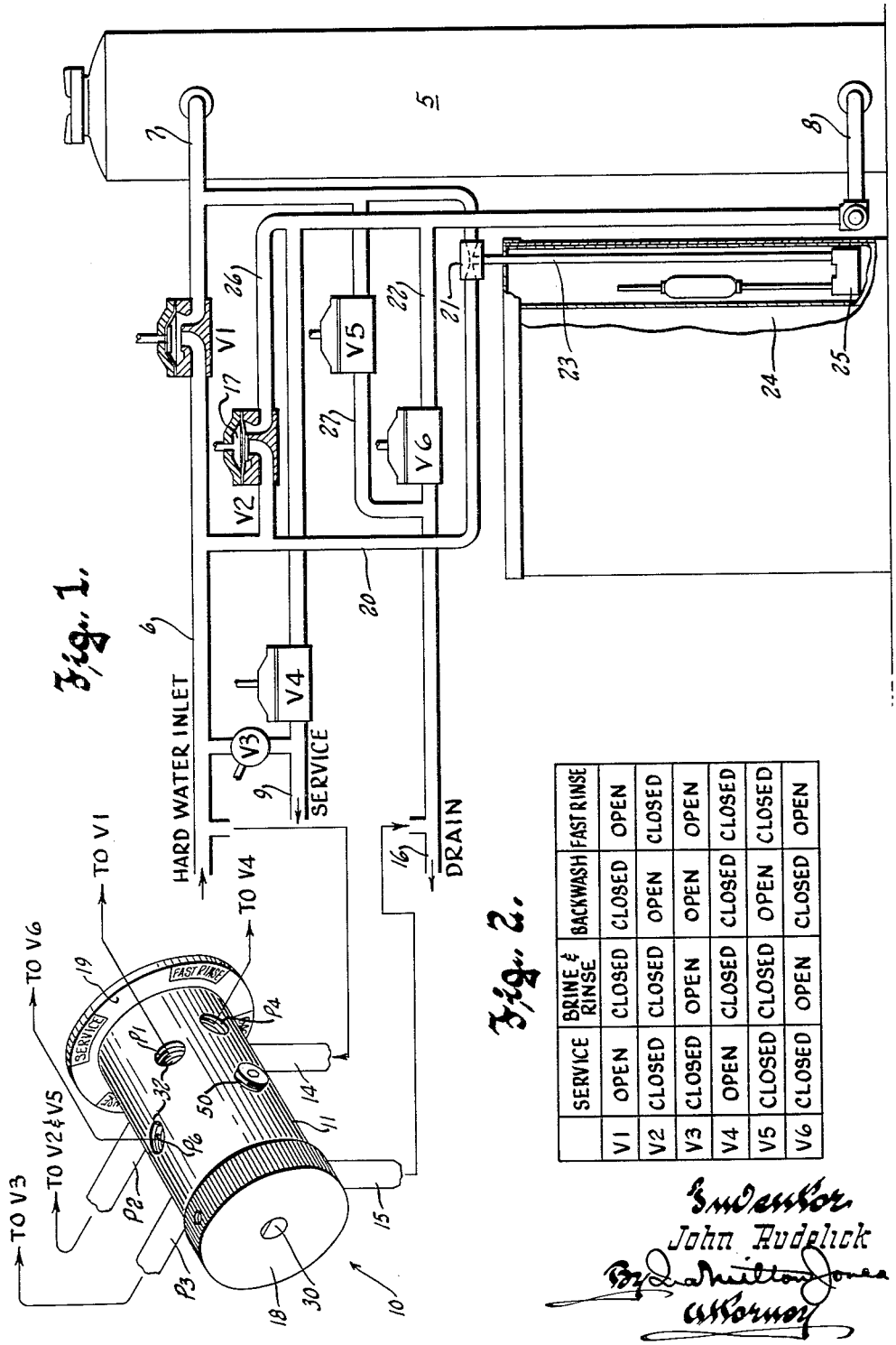

May 26, 1964 J. RUDELICK 3,134,403
ROTATABLE SPINDLE PILOT VALVE
Filed April 2, 1962 5 Sheets-Sheet 2
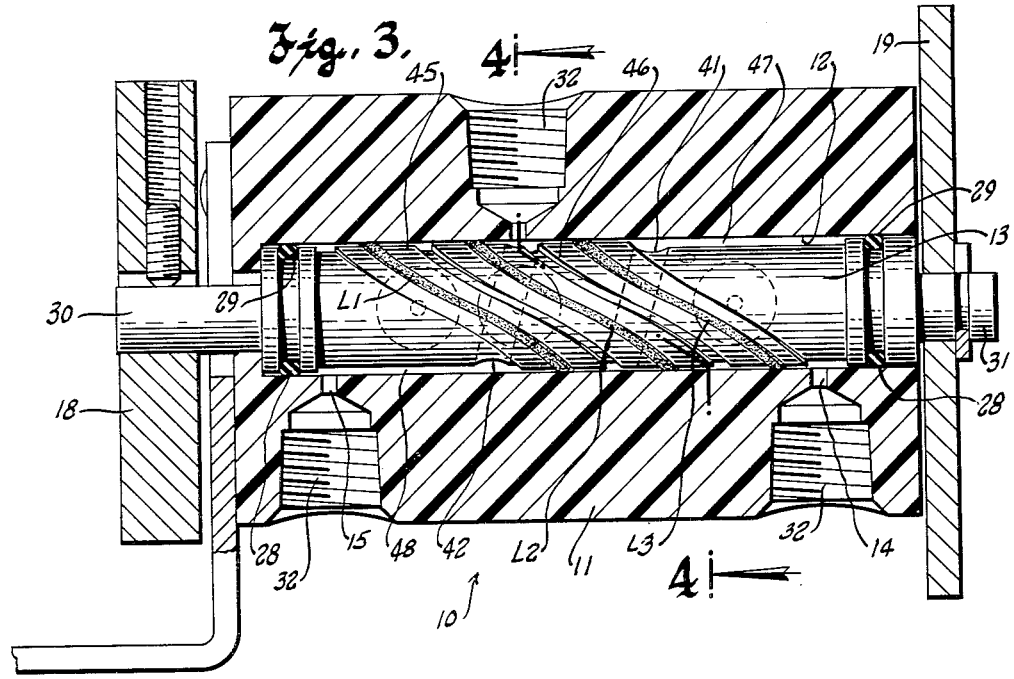
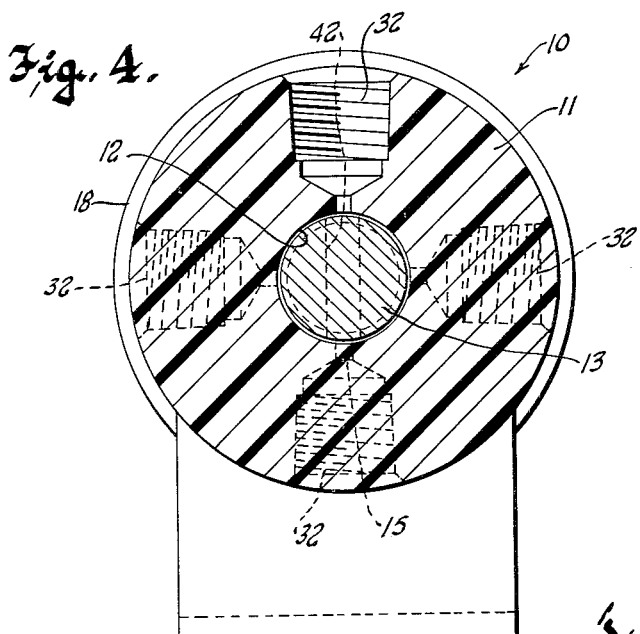
Inventor
John Rudelick
By
Attorney

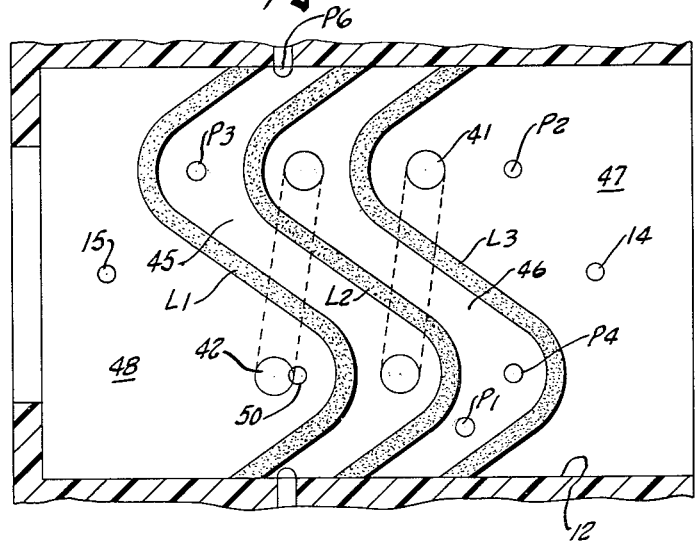
Fig. 5. (SERVICE)
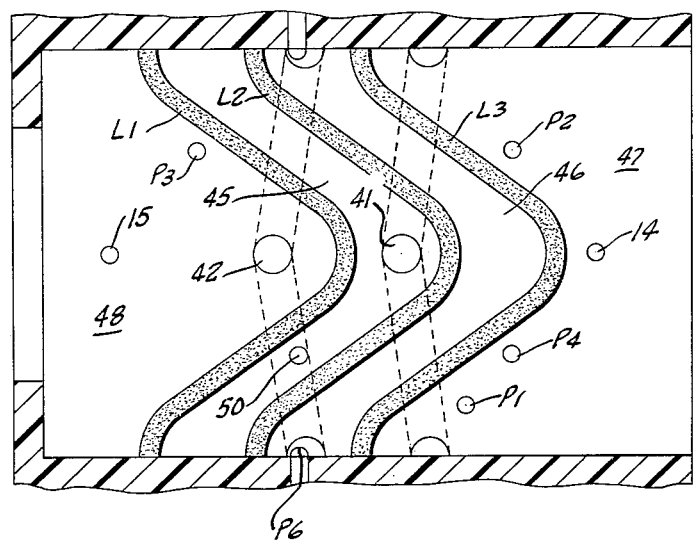
Fig. 6. (BRINE & RINSE)

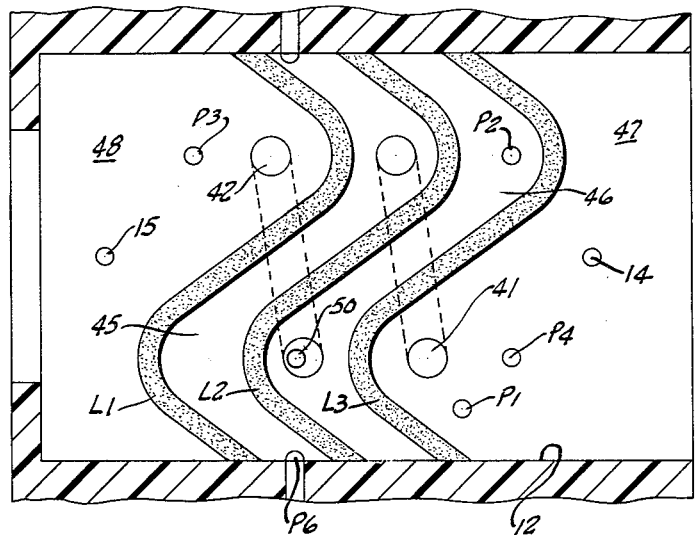
Fig. 7. (BACKWASH)
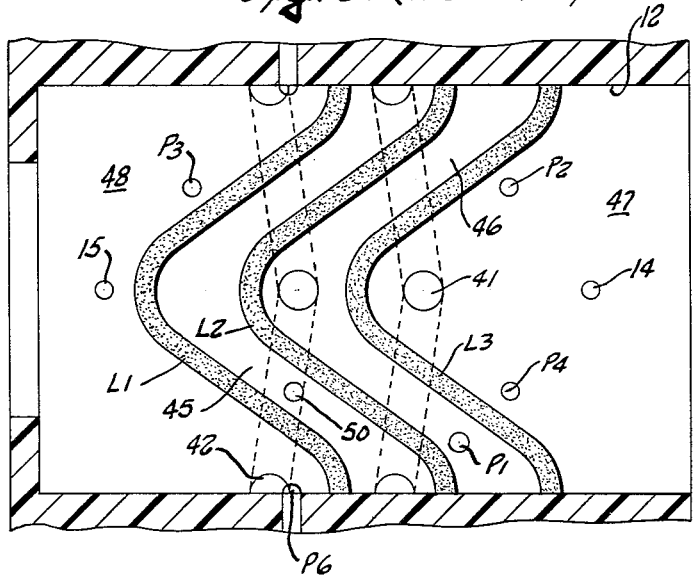
Fig. 8. (FAST RINSE)

Inventor
John Rudelick
Attorney

United States Patent Office 3,134,403
Patented May 26, 1964

3,134,403
ROTATABLE SPINDLE PILOT VALVE
John Rudelick, Milwaukee, Wis., assignor to Bruner Corporation, Milwaukee, Wis., a corporation of Wisconsin
Filed Apr. 2, 1962, Ser. No. 184,258
6 Claims. (Cl. 137—625.16)

This invention relates to valves of the type having a spindle which is rotatable in a bore in a valve body and which is provided with lands that are inclined to the spindle axis so that upon rotation of the spindle to various operating positions communication between different ports that open from the body bore can be selectively established or prevented. A valve of this type can be designated a rotatable spindle valve or, as sometimes referred to herein, an angled land valve. The invention refers more particularly to a valve of the rotatable spindle type which is particularly adapted for use as a pilot valve and which has in its body a pair of main ports that are respectively connectable with a fluid pressure source and a vent, and a plurality of controlled ports, each connectable with the pressure chamber of a pressure responsive valve. Depending upon the rotational position to which the pilot valve spindle is adjusted, each of the controlled ports is selectively communicable with one or the other of the main ports, so that in each operating position of the spindle every controlled port is connected with either a fluid pressure source or a vent.

A pilot valve of this invention has particular utility in automatic water softeners of the type disclosed in the copending application of John Rudelick, Serial No. 159,011, filed December 13, 1961, wherein a pilot valve of the rotatable spindle type cooperates with a number of pressure responsive valves to effect control of the several stages of a water softener regeneration cycle. Such a valve is useful also in many other applications, where it can function either as a pilot valve or a main control valve, as will become apparent as the description proceeds.

In a common type of rotatable spindle valve heretofore known, communication between two ports in the valve body was permitted in one operating position of the spindle, but a land on the spindle blocked such communication between said ports when the spindle was in another position of rotation. In another heretofore common arrangement a land on the spindle caused a single controlled port to be selectively communicated with one or the other of two other ports in the valve body. Thus angled land valves having two or three ports are known. However, a pilot valve for an automatic water softener apparatus must perform a more complex function since it must have as many as five or six controlled ports, each of which is connectable with the pressure chamber of a diaphragm valve, piston valve or the like, in addition to an inlet port which is connectable to a hard water source and an outlet port which is connectable to a sewer drain or other vent. Usually the pressure responsive valve is closed when its pressure chamber is communicated with the hard water source and open when its pressure chamber is vented, hence each of the controlled ports of the pilot valve must at all times be communicated through the pilot valve with either the inlet port or the outlet in order for the pilot valve to maintain control of all of the pressure responsive valves; and the pilot valve must, moreover, maintain the proper sequence of opening and closing of the several pressure responsive valves in each of its successive operating positions of spindle rotation.

With this in mind it is an object of the present invention to provide a rotatable spindle type of valve which is well adapted for employment as a pilot valve in an automatic water softener system or the like wherein there are as many as five or more fluid pressure responsive valves, each having a pressure chamber that must always be communicated with either a pressure source or a vent, depending upon whether the valve is to be open or closed, and wherein the sequence of opening and closing of the several pressure responsive valves is controlled by movement of the pilot valve spindle to successive operating positions of rotation.

More generally it is another object of this invention to provide a rotatable spindle valve of the character described having in its body a pair of main ports, one near each end of the body, and one or more controlled ports, each of which must always be communicated with either one or the other of the main ports, wherein any desired number of controlled ports can be provided in the valve body, and wherein provision can be made for any desired sequence of communication of each controlled port with one or the other of the main ports. The controlled ports in the valve body of this invention can be said to be in an "either-or" relationship to the main ports, since each controlled port is always communicated through the valve body with one or the other of the main ports, the particular main port with which it is communicated in any given operating position of the spindle being determined by the location of the controlled port on the valve body.

It will become apparent from the following description that it is another object of this invention to provide a rotating spindle valve of the character described which is unusual in its versatility, in that it can have any desired number of controlled ports and can provide for any desired sequence of communication of each of the controlled ports in "either-or" relationship to a pair of main ports, but which valve is nevertheles extremely compact, very dependable, and relatively very inexpensive.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of physical embodiments of the invention constructed according to the best modes so far devised for the practical application of the principles thereof, and in which:

FIGURE 1 is a more or less diagrammatic view of an automatic water softener system in which the rotatable spindle valve of this invention is connected, said valve being shown in perspective;

FIGURE 2 is a table of the sequence of operations performed by the apparatus illustrated in FIGURE 1, showing the position of each of the fluid pressure responsive valves in the apparatus during each operation;

FIGURE 3 is a longitudinal sectional view of the rotatable spindle valve of this invention;

FIGURE 4 is a cross sectional view taken on the plane of the line 4—4 in FIGURE 3;

Figure 9:
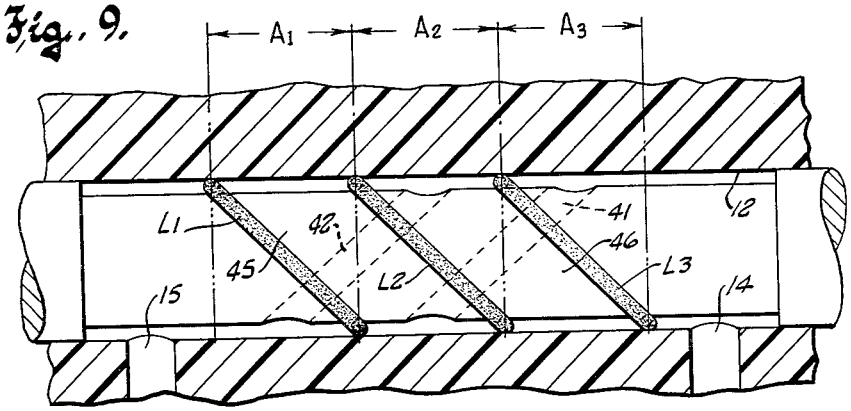
Figure 10:
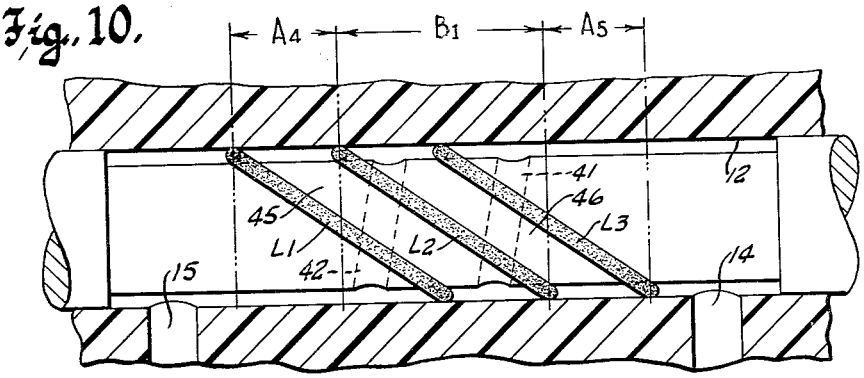
Figure 11:
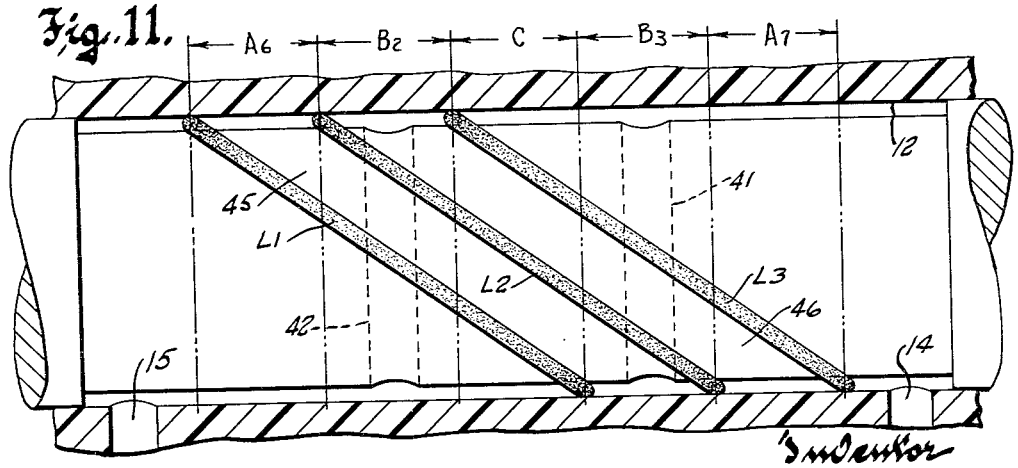

FIGURES 5-8 inclusive are projected or developed views showing the relationship of the lands on the spindle of the valve of this invention to the several ports in the valve body in each of four predetermined rotational positions of the spindle;

FIGURE 9 is a longitudinal sectional view of a modified embodiment of the valve of this invention, showing zones of the valve body in which controlled ports can be provided;

FIGURE 10 is a view similar to FIGURE 9 but illustrating a further modified form of the valve wherein control ports can be provided that are capable of a larger number of changes of connection per spindle revolution than with the valve of FIGURE 9; and FIGURE 11 is another view similar to FIGURE 9 but illustrating a still further modification of the valve, capable of a still larger number of control port connection changes per spindle revolution.

Referring now more particularly to the accompanying drawings, and considering first the embodiment of the invention illustrated in FIGURES 1–8, the numeral 5 designates a water softening tank of an automatic water softener apparatus, which tank is adapted to contain a bed of ion exchange material (not shown), preferably of the synthetic resin type. During normal service operation of the apparatus hard water from an inlet 6 enters the top of the tank through an upper duct 7, passes downwardly through the tank to be softened by the ion exchange material therein, and leaves the tank through a lower duct 8 to flow to a service system by way of a service duct 9.

From time to time the ion exchange material in the tank requires regeneration by the passage therethrough of regenerant fluid such as salt brine, and the brine must then be rinsed out of the tank and ion exchange material bed by suitable rinsing operations before service water is again permitted to flow through the tank. The several brining and rinsing operations comprising the regeneration cycle are effected under the control of the pilot valve of this invention, which is designated generally by 10, and which governs the opening and closing of a number of fluid pressure responsive valves designated V1–V6, inclusive.

In general, the pilot valve 10 comprises a body 11 having a bore 12 therethrough in which a spindle 13 (see FIGURE 3) is rotatably received. Opening from the bore 12 in the valve body are an inlet port 14, an outlet port 15, and a plurality of controlled ports P1, P2, P3, P4, P6 and 50. The inlet port 14 is connectable to a source of fluid under pressure such as the hard water source 6, while the outlet port is vented as by connecting it to a sewer or drain 16. Each of the valves V1–V6 has a pressure chamber 17 into which fluid under pressure can be introduced to effect movement of the valve to a closed position and from which such fluid can be vented to allow the valve to move to its open position. The pressure chambers of the several valves V1, V2, V3, V4 and V6, are respectively connected with the controlled ports P1, P2, P3, P4 and P6 of the pilot valve 10. The pressure chamber of valve V5 is connected to port P2 of the pilot valve, along with the pressure chamber connection of valve V2, because the valves V2 and V5 always operate in unison.

In FIGURE 1 the pressure responsive valves V1 and V2 are shown in section so that their operation can be generally understood, the valve V1 being shown in its open position and the valve V2 being shown in closed position. The several pressure responsive valves V1–V6 may comprise a unitary valve assembly like that illustrated in the copending application of John Rudelick, Serial No. 159,011, hereinabove referred to, to which reference may be made for a more complete description of the structure and operation of the individual valve elements.

Each of the pressure responsive valves is open when the controlled port with which its pressure chamber is connected is communicated through the bore 12 in the pilot valve body with the outlet port 15, and is closed when its controlled port is communicated with the inlet port 14. Hence the table, FIGURE 2, designates the communications established by the spindle, in each of its operating positions of rotation, between the controlled ports and the respective inlet and outlet ports. In this case the spindle has four defined rotational positions, 90° apart.

For the sake of simplicity, the spindle of the pilot valve is shown as provided with a manual actuator knob 18 by which it may be moved at appropriate times to its several rotational positions of operation, which can be indicated by suitable legends delineated on a dial 19 that turns with the spindle. It will be understood however, that an electric timing motor would normally be coupled to the spindle so as to render operation of the system fully automatic.

During normal service operation of the apparatus, the valve V1 is open to allow hard water to flow from the hard water source 6 to the duct 7 at the top of the softening tank; and the valve V4 is open to allow softened water to flow from the bottom of the tank through the duct 8, through said valve V4, and to the service duct 9. The remainder of the valves are closed, and hence the spindle of the pilot valve is in a rotational position at which it provides for the venting of the pressure chambers of the valves V1 and V4 and for the introduction of water under pressure from the hard water source into the pressure chambers of all the other valves.

When the spindle is rotated through 90° counterclockwise from its service position it is brought to a brine and rinse position at which all of the valves except V3 and V6 are closed. Through the open valve V3 the hard water inlet is communicated directly with the service system duct 9, to insure that water will be supplied to the service system during the entire regeneration cycle, and valve V3 is kept open at all time that the apparatus is not in service operation.

With the valves V1, V2, V4 and V5 closed, hard water flows from the source 6, by way of a bypass duct 20 that carries the water around the valve V1 and to the upper tank duct 7. The bypass duct includes an injector 21, the side inlet of which is connected with a brine intake duct 23 that opens to the bottom of a brine storage vessel 24 through a float controlled brine valve 25. Hence the flow of water through the injector 21 educts brine from the brine storage vessel and causes such brine to be introduced into the softener tank through the upper tank duct 7. After passing downwardly through the bed of ion exchange material in the tank, the brine flows to the drain 16 through the lower tank duct 8, a branch drain duct 22 and the open valve V6.

When the supply of brine in the brine storage vessel 24 drops to a predetermined level, the float valve 25 closes, and hard water from the inlet source continues to be circulated downwardly through the tank and to the drain to effect a slow and preliminary downflow rinse of the ion exchange material in the tank.

After a predetermined period of slow rinse, the spindle of the pilot valve 10 is shifted another 90° in a counterclockwise direction to a position at which it causes backwashing of the ion exchange material in the softening tank. In this backwashing position the pilot valve effects introduction of pressure fluid from the hard water source to the pressure chambers of the valves V1, V4 and V6, to maintain said valves closed, and vents the pressure chambers of the valves V2, V3 and V5 to permit opening of those valves. With the opening of valve V2, hard water can flow through a duct 26 that communicates the hard water source with the lower tank duct 8. The fresh water thus introduced into the bottom of the tank flows upwardly through the ion exchange material bed, and leaves the tank by way of the upper tank duct 7, whence it flows to the drain 16 by way of a duct 27 that is controlled by the valve V5.

During backwashing, water can also enter the bypass duct 20 from the hard water source to flow through the injector 21 and the brine duct 23 into the brine storage vessel, where it contacts a store of salt in the vessel and forms brine in preparation for the next regeneration cycle.

After a predetermined interval of backwashing operation the pilot valve spindle is rotated another 90° counterclockwise to a fast rinse position at which the pilot valve effects closing of the valves V2, V4 and V5 and maintains valves V1, V3 and V6 in their open positions.

With the opening of valve V1 water from the source 6 can once again enter the top of the tank through the upper tank duct 7, and flow downwardly through the mineral bed and out through the lower tank duct 8, and thence to the drain through the open valve V6 and the duct 22 controlled thereby. Since there is substantially no pressure drop across the injector 21 during such fast rinse operation, due to the negligible restriction presented by the valve V1 filling of the brine vessel can continue at this time until terminated by closure of the float valve 25.

After a suitable fast rinsing period the pilot valve spindle is rotated a further 90° counterclockwise back to its service position.

The spindle 13 of the pilot valve 10 which controls such operation of the apparatus is only slightly smaller in diameter than the bore 12 in the valve body in which the spindle is received so that the radial spacing between the spindle and the surface of the bore is relatively very small. Hence only a very small amount of liquid is required to fill the space between the spindle and the valve body, thus enabling the pilot valve to bring about very rapid action of the pressure responsive valves controlled thereby.

At its opposite ends the spindle has lands 28 which encircle it and which are disposed in planes normal to the spindle axis to provide seals between the spindle and the ends of the bore surface. Preferably these lands include rubber O-rings 29 or similar gland-like seals that engage both the spindle and the body under radial compression.

Coaxial stems 30 and 31, which can be integral with the spindle, project endwise out of the body, and the manual actuator knob 18 is non-rotatably secured to the stem 30, while the dial 19 is similarly secured to the stem 31 for rotation with the spindle.

The inlet port 14 and the outlet port 15 open through the body from locations near the opposite ends of the bore 12 therein. The controlled ports P1, P2, P3, P4, P6 and 50 open from the bore at locations which are intermediate the inlet and outlet ports and axially spaced therefrom. All of the ports are relatively small diameter orifices, and the side wall of the valve body is thick enough so that the ports can open to the bottoms of deeper and wider radially outwardly opening threaded wells 32, which receive the fittings that connect the several control ducts with the pilot valve. These ducts can be very small diameter flexible plastic tubes, and hence it will be appreciated that the pilot valve is shown on a much enlarged scale in FIGURES 3 and 4.

Completely encircling the spindle are three lands L1, L2, L3 and which are preferably provided by resilient quad rings or the like that are received in grooves in the spindle and which are thus confined under radial compression between the spindle and the surface of the bore to have good sealing engagement with the valve body. The lands are disposed in planes which are inclined at a substantial oblique angle to the spindle axis, and the planes of the several lands are parallel to one another. All portions of the lands are disposed within a zone axially inward of the inlet and outlet ports 14 and 15, and all of the controlled ports open from the bore 12 within this zone so as to be swept by one or more of the lands at each complete rotation of the spindle.

Because the ports in the valve body are relatively small, and preferably have a diameter which is slightly less than the width of a land, the resilient lands can pass readily across the ports as the spindle is rotated. Hence the lands will not be cut or scored by the circumferential corners at the inner ends of the ports as would be the case if the ports were substantially larger than the width of the lands.

In certain of the operating positions of the pilot valve spindle, the spaces 45 and 46 between the lands register with certain of the controlled ports. To communicate these spaces, and hence the controlled ports, with the inlet and outlet ports, the spindle has two passages 41 and 42 extending substantially diametrically therethrough. At one of its ends the passage 41 opens to the side of the spindle in the space 45 between the two lands L1 and L2 which are axially remote from the inlet port 14, and at its other end the passage 41 opens to the bore 12 axially outward of the land L3. Similarly the passage 42 opens to the space 46 between lands L2 and L3, and to the bore 12 axially outward of the land L1.

Thus the three lands can be said to cooperate with the spindle in dividing the bore 12 in the pilot valve body into four axially spaced apart compartments, namely the axially outermost compartments 47 and 48 from which the inlet port 14 and the outlet port 15, respectively, open directly, and the two axially inner compartments 45 and 46, which are respectively communicated with the outer compartment 47 through the passage 41 and with the outer compartment 48 through the passage 42. It will be noted that each of the inner compartments 45 and 46 is thus communicated with its axially remote outer compartment.

The location of each controlled port is determined by the sequence of connections that it is to have with the inlet and outlet ports and the operating positions of rotation that are established for the spindle. In this case ports P2 and P3 are the controlled ports which are respectively nearest the inlet and outlet ports 14 and 15, and they are axially in line with one another. The axial and circumferential location of port P2 is such that it is swept only by portions of land L3 during each revolution of the spindle, so that in the backwash position of the spindle (illustrated in FIGURE 7) the land L3 is interposed between the inlet port and port P2, and the space or groove 46 is in register with said controlled port to communicate the same with the outlet port 15 by means of the passage 42. In all of the other three predetermined positions of the spindle, controlled port P2 has direct communication through the body bore with the inlet port 14.

Similarly, controlled port P3 is so located as to be swept only by portions of land L1 during each spindle revolution. Hence in the service position of the spindle, shown in FIGURE 5, the groove 45 registers with controlled port P3 to communicate the same with inlet port 14 by way of passage 41; but in the other three operating positions of spindle rotation port P3 is directly communicated through the body bore with outlet port 15.

Controlled port P4 is located diametrically opposite port P2 in the valve body and hence groove 46 registers with port P4 in the service position of the spindle (FIGURE 5), thus communicating it with the outlet port 15 through passage 42; but in the other three spindle positions port P4 is directly communicated with the inlet port 14. In other words, the sequence of connections of port P4 with the main ports is 180° of spindle rotation out of phase with the connection sequence of port P2, due to the diametrically opposite locations of those controlled ports.

Controlled port P1 is located axially inwardly of the plane containing ports P2 and P4, but in a position where it too is swept only by portions of land L3 during each revolution of the spindle. It is circumferentially 45° counterclockwise from port P4, and its location is such, with relation to the inclination of the lands on the spindle, that in the service (FIGURE 5) and fast rinse (FIGURE 8) positions of the spindle the groove 46 registers with port P1 to communicate it with the outlet port 15 by way of passage 42, while in the brine and rinse (FIGURE 6) and backwash (FIGURE 7) positions of the spindle, it is communicated directly with the inlet port 14 through the valve body bore.

Controlled port P6 is located on a line 90° counterclockwise from an axial line through port P4 and 90° clockwise from the line through ports P2 and P3; and it is axially intermediate ports P3 and P1, in a location where it is swept during each spindle revolution by portions of lands L1 and L2. In the service (FIGURE 5) position of the spindle, and in the backwash (FIGURE 7) position, the groove 45 registers with port P6 to communicate it, through passage 41, with the inlet port 14. In the brine and rinse (FIGURE 6) position of the spindle the space 46 registers with port P6 to communicate it, through passage 42, with the outlet port 15. In the fast rinse (FIGURE 8) position of the spindle port P6 is communicated directly with the outlet 15 through the body bore 12.

Other controlled ports can of course be provided in the valve body, as for example the port 50 which is plugged when the pilot valve is incorporated in apparatus like that illustrated in FIGURE 1 but which is used when the pilot valve is employed for the control of a piston valve automatic water softener apparatus of the type illustrated in the copending application of John Rudelick, Serial No. 184,257, filed April 2, 1962. When used in such apparatus controlled port P4 would be plugged. The port 50 is axially in line with controlled port P4 and in radial alignment with controlled port P6, so that it has the same sequence of connections with the inlet and outlet ports as port P6, but its connection sequence is 90° of spindle rotation out of phase with that of port P6.

Other controlled port arrangements could also be provided to afford an almost unlimited number of sequences of connections of controlled ports with the inlet and outlet ports.

FIGURES 9-11 show three modified embodiments of the valve of this invention which illustrate its versatility. The valves of FIGURES 9 and 10 are not necessarily of practical value (although definitely operative), but are presented to show how the arrangement of the lands affects the sequence of reconnections of the controlled ports.

In the valve of FIGURE 9 the lands L1, L2 and L3 are disposed in parallel planes that have a relatively small inclination to the spindle axis, and they are so spaced along the spindle axis that each land sweeps a zone along the length of the spindle bore which does not overlap any of the zones swept by the other lands. Thus land L1 exclusively occupies zone A1, land L2 exclusively occupies zone A2, and land L3 exclusively occupies zone A3. Hence a controlled port located anywhere in zones A1, A2 or A3 will be swept by portions of only one land during each complete rotation of the spindle, and will therefore undergo only two different connections with the main ports 14 and 15 during the course of the spindle cycle. The relative portions of the spindle cycle during which a controlled port will be connected with each main port will be determined solely by the axial location of the controlled port within its zone A1, A2, or A3. Thus if the controlled port is located toward the right hand side of zone A2, it will be communicated with the outlet port 15 during the major portion of each spindle revolution, when the inter-land space 46 registers with it, and will be communicated with the inlet port 14 during the remainder of the cycle when inter-land space 45 registers with it.

In the valve shown in FIGURE 10 the lands L1, L2 and L3 have a somewhat greater inclination to the spindle axis and are spaced apart at somewhat shorter intervals, so that portions of each of the outermost lands L1 and L3 sweep a zone B1 in common with portions of the central land L2. Hence any controlled port located within the axial zone B1 will be swept by portions of two different lands during each full revolution of the spindle, and will therefore undergo four changes of connection with the main ports during each cycle. Axially outward of the zone B1 are zones A4 and A5 that are swept only by the outermost lands, and controlled ports located in these zones will undergo only two different changes of connection during each spindle revolution.

The embodiment of the invention illustrated in FIGURE 11 offers the greatest versatility. Here the planes of the lands are quite steeply inclined, so that portions of all three lands L1, L2 and L3 occupy a common zone C. Hence a controlled port located in zone C will be swept, during each complete spindle revolution, by portions of all three lands, to undergo six changes of connection with the main ports. Axially outward of the zone C are a pair of zones B2 and B3 which are swept by portions of the center land L2 and of lands L1 and L3 respectively. A controlled port located in zone B2 or B3 will therefore undergo four changes of connection with the main ports during each complete spindle rotation. Axially outward of zones B2 and B3 are zones A6 and A7, which are swept only by portions of the outermost lands, and hence controlled ports located in zones A6 and A7 will undergo only two changes of connection with the main ports during each spindle cycle.

In general, proper spacing of a controlled port axially along the valve body allows it to be connected with either main port during any desired portion of the rotational cycle of the spindle. As between any two controlled ports the relative timing of their changes of connection with the main ports is determined by their relative locations circumferentially around the valve body. Obviously there is no limit to the number of controlled ports that can be connected in "either-or" relationship with the main ports in a valve of this invention except the practical limitations imposed by relative port and valve body sizes. Thus the valve of this invention lends itself to an almost infinite variety of sequences of connections of the controlled ports with the main ports, it being necessary only to establish the controlled ports in such axial locations relative to the lands and such circumferential locations relative to one another as to provide the type of operation desired.

From the foregoing description taken together with the accompanying drawings it will be apparent that this invention provides a valve of the rotatable spindle type which is well adapted for use as a pilot valve that cooperates with a number of pressure responsive valves to at all times communicate the pressure chamber of each of the latter with either a fluid pressure source or a vent, and by which the required connection of every pressure responsive valve can be effected in each of a number of different rotational positions of the pilot valve spindle, corresponding to successive steps in an operating sequence. It will also be apparent that the angled land valve of this invention is not only extremely versatile but is relatively inexpensive, extremely compact, capable of prompt actuation of pressure responsive valves with which it is connected, and is capable of long continued use without requiring attention, and particularly without requiring replacement of the resilient members comprising the lands.

What is claimed as my invention is:

1. A valve of the type having a valve body with a bore therein and a spindle rotatable in the bore and by which communication is controlled between ports in the valve body that open from its bore, said valve being characterized by the following:
  (A) the body has a pair of main ports, one opening from its bore near each end thereof, and a plurality of controlled ports opening from the bore in a zone intermediate the main ports;
  (B) the spindle is encircled by three axially spaced apart lands which sealingly engage the surface of the body bore around its entire circumference,
    (1) said lands being disposed in planes which are parallel to one another and obliquely inclined to the spindle axis, and
    (2) all portions of the lands being located between a pair of planes normal to the spindle axis which are spaced axially inward from the main ports and define said zone, so that the lands at all times prevent communication through the bore between the main ports; and
  (C) the spindle has a pair of passages therethrough, each of which communicates one of the spaces between lands with an end portion of the bore which is axially remote from the lands defining that space, so that when the spindle is in a position of rotation such that a space between lands registers with one of said controlled ports, the latter port is communicated with a main port through the passage opening to that space.

2. A valve of the type having a body with a bore therein and a spindle rotatable in the bore and by which communication is controlled between ports in the valve body that open from its bore, said valve being characterized by the following:
- (A) the spindle has means thereon cooperating with the wall of the body bore to define four axially spaced apart chambers in the valve body, said means comprising three lands encircling the spindle and sealingly engaging the surface of the body bore around its entire circumference so as to block commmunciation between axially adjacent chambers, said lands being disposed in planes which are parallel to one another and obliquely inclined to the spindle axis;
- (B) the valve body has a pair of main ports, each opening from one of the axially outer of said chambers, and a plurality of controlled ports opening from the bore in a zone swept by the lands on the spindle, and
- (C) the spindle has a pair of passages therein, each communicating one of the axially inner chambers with that one of the outer chambers which is remote from said inner chamber, so that when the spindle is in a rotational position in which one of the axially inner chambers registers with a controlled port opening from the body bore anywhere within the zone swept by the lands, said controlled port is communicated with a main port through the passage opening to that inner chamber, and so that as the spindle is rotated said controlled port is successively communicated with first one and then the other of the main ports each time a land sweeps across said controlled port.

3. The valve of claim 2, further characterized by the fact that the planes in which the lands are disposed are inclined at such an angle to the spindle axis, and are spaced apart by such distances, that a plane normal to the spindle axis which intersects the medial land will also intersect one of the outer lands, so that a controlled port opening from the body bore in the zone defined by the axial extremities of the medial land will be swept by at least two different lands during each complete revolution of the spindle to undergo four alternations of connection with the main ports.

4. The valve of claim 2, further characterized by the fact that the planes in which the lands are disposed are inclined at such an angle to the spindle axis, and are spaced apart by such distances, that all three lands have portions which lie between a pair of axially spaced apart planes that are normal to the spindle axis and that intersect the axially innermost portions of the outer lands, so that a controlled port opening from the body bore anywhere in a zone between said pair of planes is swept by portions of all three lands, to undergo six alternations of connection with the main ports.

5. In a valve apparatus comprising a plurality of pressure responsive controlled valves, each of which is movable between open and closed positions and each of which has a pressure chamber into which fluid under pressure can be introduced to effect movement of the valve to one of its positions and from which fluid can be vented to allow the valve to move to the other of its positions, means for effecting opening and closing of the controlled valves in a predetermined sequence, comprising:
- (A) a bored pilot valve body having
  - (1) a pair of main ports
    - (a) one of which provides an inlet port opening from the body bore near one end thereof and connectable with a source of fluid under pressure, and
    - (b) the other of which provides an outlet port opening from the body bore near the other end thereof,
  - (2) said body also having a plurality of controlled ports, each connectable with the pressure chamber of a controlled valve, opening from the bore in a zone intermediate and axially spaced from the main ports;
- (B) a spindle coaxially received in the bore in the valve body and constrained to rotation therein;
- (C) three axially spaced apart lands encircling the spindle and sealingly engaging the surface of the bore around its entire circumference,
  - (1) said lands being disposed in parallel planes which are obliquely inclined to the spindle axis, and
  - (2) all portions of said lands being disposed within said zone so that each of the controlled ports is swept by at least one land during each rotation of the spindle; and
- (D) said spindle having a pair of passages therethrough, each of which opens at one end to one of the spaces between lands and opens at its other end to the portion of the bore that is axially outward of the land remote from said space, so that as the spindle is rotated each of the controlled ports is successively communicated with first one and then the other of the main ports each time a land crosses the controlled port.

6. A pilot valve comprising a body having a bore therein from which open an inlet port connectable with a source of fluid under pressure, an outlet port connectable with a drain or the like, and a plurality of controlled ports, and wherein a spindle is constrained to coaxial rotation in the body bore to carry it to a plurality of defined positions of rotation, at each of which the spindle blocks communication through the bore between certain of the controlled ports and the inlet port and blocks communication through the bore between the remainder of the controlled ports and the outlet port, said valve being characterized by the following:
- (A) the body has
  - (1) the inlet port located near one end thereof,
  - (2) the outlet port located near its other end, and
  - (3) the controlled ports in its side wall, in a zone axially intermediate the inlet and outlet ports and spaced axially from them;
- (B) the spindle has three axially spaced apart circumferential lands thereon, each of which completely encircles the spindle and sealingly engages the surface of the bore around its entire circumference, and
  - (1) said lands are inclined to the spindle axis and
  - (2) are all disposed within said zone; and
- (C) the spindle has a pair of passages therethrough
  - (1) one of which opens to the space between lands that is axially remote from the inlet port and to the portion of the bore that is axially outward of the land remote from said space, so that when the spindle is in a rotational position at which said space registers with a controlled port, such controlled port is communicated, through said passage, with the inlet port,
  - (2) and the other of which passages opens to the space between lands that is axially remote from the outlet port and to the portion of the bore that is axially outward of the land remote from said space so that when the spindle is rotated to a position at which said other space registers with said controlled port, the latter is communicated through said other passage with the outlet port.

References Cited in the file of this patent
UNITED STATES PATENTS
2,397,594    Buchanan             Apr. 2, 1946